(12) United States Patent
Colombo et al.

(10) Patent No.: US 10,067,255 B2
(45) Date of Patent: Sep. 4, 2018

(54) AUTOMATIC QUALITY CONTROL OF SEISMIC TRAVEL TIME

(71) Applicant: Saudi Arabian Oil Company, Dhahran (SA)

(72) Inventors: Daniele Colombo, Dhahran (SA); Federico Miorelli, Al Khobar (SA); Diego Rovetta, Ras Tanura (SA); Gary Wayne McNeice, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 335 days.

(21) Appl. No.: 14/845,627

(22) Filed: Sep. 4, 2015

(65) Prior Publication Data

US 2017/0068008 A1   Mar. 9, 2017

(51) Int. Cl.
*G01V 1/00* (2006.01)
*G01V 1/36* (2006.01)
*G01V 1/28* (2006.01)

(52) U.S. Cl.
CPC .............. *G01V 1/362* (2013.01); *G01V 1/288* (2013.01); *G01V 2210/53* (2013.01)

(58) Field of Classification Search
CPC combination set(s) only.
See application file for complete search history.

(56) References Cited

U.S. PATENT DOCUMENTS

| | | |
|---|---|---|
| 4,577,298 A | 3/1986 | Hinkley |
| 5,073,876 A | 12/1991 | Propes |
| 5,508,914 A | 4/1996 | Lee |
| 5,920,828 A | 7/1999 | Norris et al. |
| 6,016,287 A | 1/2000 | Klebba et al. |

(Continued)

FOREIGN PATENT DOCUMENTS

| | | |
|---|---|---|
| CN | 104181599 A | 12/2014 |
| EP | 0995133 B1 | 12/2003 |

OTHER PUBLICATIONS

The International Search Report and Written Opinion for related PCT application PCT/US2016/066262 dated Apr. 11, 2017.

(Continued)

*Primary Examiner* — Krystine E Breier
(74) *Attorney, Agent, or Firm* — Bracewell LLP; Constance G. Rhebergen; Albert B. Kimball, Jr.

(57) ABSTRACT

Seismic data from seismic exploration surveys are mapped into a hypercube of bins or voxels in a four-dimensional space (X, Y, Offset, and Azimuth) according to Common Mid-Point (or CMP) between source and receivers. The mapped data from individual voxels or bins is then analyzed by multimodal statistics. Robust estimates of first break picks are obtained from the analysis. The first break picks are then used to as seed inputs for autopicking iteration, which proceeds to convergence. Estimates of confidence levels in the data are provided for re-picking to reduce computer processing time in successive autopicking iterations. Analysis is provided of different seismic attributes such as azimuthal velocity variations indicative of anisotropy, positioning errors of sources/receivers, geometry errors, and three dimensional distribution of inversion residuals. Analysis is also performed of standard deviation of the travel time data useful for estimating data errors in the inversion covariance matrix.

8 Claims, 11 Drawing Sheets

(56) References Cited

U.S. PATENT DOCUMENTS

| | | | |
|---|---|---|---|
| 6,188,964 | B1 | 2/2001 | Reister et al. |
| 6,208,587 | B1 | 3/2001 | Martin |
| 6,697,737 | B2 | 2/2004 | Jones et al. |
| 6,757,616 | B1 | 6/2004 | Emmons et al. |
| 7,675,813 | B2 | 3/2010 | Valero et al. |
| 9,435,903 | B2* | 9/2016 | Bones ............... G01V 1/32 |
| 2006/0262645 | A1 | 11/2006 | Van Baaren |
| 2009/0299637 | A1* | 12/2009 | Dasgupta ............ G01V 1/008 702/12 |
| 2010/0228530 | A1* | 9/2010 | Valero ................. E21B 43/26 703/2 |
| 2011/0096626 | A1 | 4/2011 | Zhu et al. |
| 2012/0106293 | A1 | 5/2012 | Yilmaz |
| 2013/0176823 | A1 | 7/2013 | Le Meur et al. |
| 2014/0198605 | A1* | 7/2014 | Grion ................. G01V 1/308 367/7 |
| 2017/0176621 | A1* | 6/2017 | Valero ................. G01V 1/50 |

OTHER PUBLICATIONS

Shi et al., "A Layer-Stripping Method for 3D Near-Surface Velocity Model Building Using Seismic First-Arrival Times", Journal of Earth Science, 2015, pp. 502-507, vol. 26, No. 4, China University of Geosciences and Springer-Verlag Berlin.

International Search Report and Written Opinion for related PCT application PCT/US2016/049248 dated Dec. 5, 2016.

Khan, "Artificial intelligence based automated first bereak pickiing and quality control", SEG/San Antonio Meeting, 2007, p. 1103-1107.

Saragiotis et al., "Near-surface Traveltime Tomographic Inversion Using Multiple first Break Picks", 75th EAGE Conference & Exhibition incorporating SPE EUROPEC, 2013, pp. 1-5.

Zamorouev, "Automatic picking of seismic events", SEG Technical Program Expanded Abstracts, 1999, pp. 1-4.

Burnstad, "New Concepts in Quality Control for 3D Near Surface Modeling", SEG Houston International Exposition and Annual Meeting, 2009, pp. 3203-3207.

Cambois et al., "Surface-consistent deconvolution in the log/Fourier domain", Geophysics, 1992, pp. 823-840, vol. 57, No. 6, Society of Exploration Geophysicists.

Keho et al., "Focus on land seismic technology: The near-surface challenge", The Leading Edge, 2012, pp. 62-68.

Sabbione et al., "Automatic first-breaks picking: New strategies and algorithms", Geophysics, 2010, pp. V67-V76, vol. 75, No. 4, Society of Exploration Geophysicists.

Taner et al., "A unified method for 2-D and 3-D refraction statics", Geophysics, 1998, pp. 260-274, vol. 63, Society of Exploration Geophysicists.

Taner et al., "Estimation and Correction of Near-Surface Time Anomalies", Geophysics, 1974, pp. 441-463, vol. 39, No. 4, Society of Exploration Geophysicists.

Taner et al., "Surface consistent corrections", Geophysics, 1981, pp. 17-22, vol. 46, No. 1, Society of Exploration Geophysicists.

Wiggins et al., "Residual Statics Analysis as a General Linear Inverse Problem", Geophysics, 1976, pp. 922-938, vol. 41, No. 5, Society of Exploration Geophysicists.

* cited by examiner

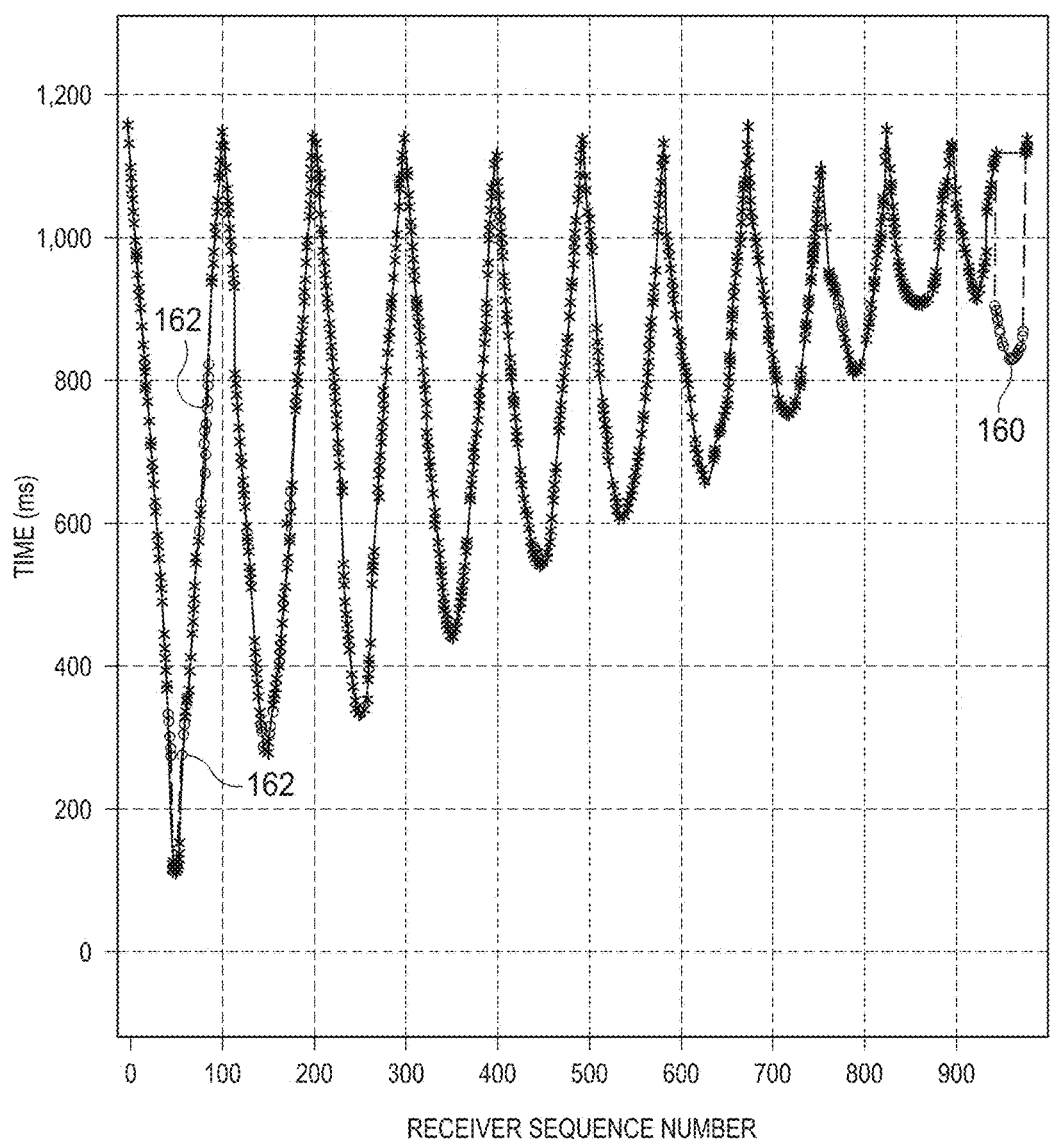

AUTOMATIC QUALITY CONTROL OF SEISMIC TRAVEL TIME

BACKGROUND OF THE INVENTION

1. Field of the Invention

The present to geophysical exploration, and more particularly to seismic surveying and processing of seismic data to improve the quality of the large sets of data for more accurate results regarding subsurface formations.

2. Description of the Related Art

In geophysical exploration, seismic surveys are performed to produce images of the various rock formations in the earth. The seismic surveys obtain seismic data indicating the response of the rock formations to the travel of elastic wave seismic energy. The seismic data are then processed and analyzed to produce the images in both time and depth domains of the formations and their locations in an area of interest beneath the earth's surface. It is important for the processing results to be accurate. One of the bases for accurate processing results is that an accurate estimate of the velocity of travel of the seismic energy waves is recovered. However, the velocity function is not a fixed value over its paths of travel through the earth. The seismic velocity varies for several factors, such as the density of the rock in the formations and the depth of the formations during such travel.

During seismic surveys, the shallow or near surface part of the earth is where most of the complexities are concentrated, due to the existence of phenomena such as weathering and geomorphological processes. Geological features such as faults which generate sharp velocity contrasts in this section of the earth add to the complexity of the problem.

Accurate description of the variable velocities occurring in the near surface earth is very important for seismic imaging in the time and depth domains. Recent developments in the field of seismic velocity estimation by a process known as full waveform inversion (or FWI) has placed emphasis on the use of refracted energy arrivals present in the seismic data for long offset distances between the source and seismic sensors. The refracted energy arrivals are used to achieve maximum depth of penetration in velocity reconstruction, both in land and marine datasets. Seismic processing in either the time or depth domain is also becoming increasingly dependent on an insightful use of refracted waves at variable amounts of offsets corresponding to increasing depths of penetration.

Near surface velocity variations can distort the seismic images both in time and depth domains leading to erroneous evaluations of position, depth and nature of drilling targets. To correct for this, an estimate of near surface seismic wave velocities must be made. A common practice in land seismic data, and increasingly used also in long offset marine datasets, is to pick the first arrival time of direct and refracted waves on collections of seismic traces, known as gathers. The travel times of seismic waves through the earth from sources to receivers are then inverted to obtain estimates of seismic velocities extending at depths proportional to the source-receiver offsets and depending on the specific geology. The "first break picking" is a time consuming process, it requires human intervention to perform quality control and is considered a major bottleneck in the seismic data processing cycle.

Seismic industry practices in imaging and inversion (such as full wave inversion) have been rapidly evolving in recent years. However, the industry practices have, so far as is known, still involved processes which rely on some preliminary labor-intensive analytical work to select or pick from the data phenomena which are known as first breaks (or FB). Selection of an accurate and proper first break is necessary to obtain a robust estimate of the earth's acoustic velocity in the near surface region. The estimate of earth's acoustic velocity in the near surface region serves as the basis for subsequent processing to determine an accurate velocity function indicating the various acoustic velocities for the deeper earth formations as functions of time or depth.

There have been some automated or computerized autopicker methods developed and available over the years. However, these still have required significant manual intervention by an analyst for guiding the estimates, such as manual picking on a reduced set of data gathers to be used as a guide for the autopicker methods, as well as for quality control of the results from the autopicker process.

Further, post-picking quality control of the first break picks, whether from manual picks or from autopickers is largely unmanaged. So far as is known, no reliable methodology exists for handling billions of picks from large three dimensional seismic surveys. Thus, most of the work has taken the form of random checks of very small portions of the survey dataset. Large undetected errors are likely to remain in the data used for subsequent inversion processing. These errors can be due to noise or to mis-picking as a result, for example, of high-energy later arrivals from cycle skipping common in layered geology exhibiting velocity inversions between adjacent formation layers.

SUMMARY OF THE INVENTION

Briefly, the present invention provides a new and improved computer implemented method of forming corrected measures of refracted seismic energy arrival times during travel from a seismic source to an array of seismic detector geophones during a seismic survey by removing anomalous arrival times from a seismic trace dataset detected by the seismic detector geophones during the seismic survey. A seismic trace dataset detected by the array of detector geophones during the survey is assembled in the computer, and a first break dataset of initial estimates of the refracted energy arrival times at the detector geophones of the array is selected in the computer from the seismic trace dataset. The selected initial estimates of arrival times of the first break dataset are sorted into offset bins of a travel time attribute cube according to common midpoints for refracted seismic wave travel between the seismic source and individual ones of the detector geophones of the array, with the common midpoints being organized into dimensional offsets of the detector geophones of the array. Measures of the time distribution of the selected initial estimates of arrival times in individual ones of the offset bins of the travel time attribute cube are formed. Arrival times which differ from the measures of the time distribution by more than a specified time interval are removing from the first break dataset. An adjusted arrival trace dataset is formed of the arrival times remaining after the differing arrival times are removed. The arrival times of the adjusted arrival trace dataset are compared with a specified measure of accuracy, and if the compared arrival times of the adjusted arrival trace dataset are within the specified measure of accuracy, the compared arrival times of the adjusted arrival trace dataset are stored as the corrected measure of the arrival times. If not, the steps of removing arrival times which differ from the measures of the time distribution by more than a specified time interval, and comparing the arrival times of the adjusted arrival trace dataset with a specified measure of accuracy are repeated for the adjusted arrival trace dataset.

The present invention also provides a new and improved data processing system forming corrected measures of refracted seismic energy arrival times during travel from a seismic source to an array of seismic detector geophones during a seismic survey by removing anomalous arrival times from a seismic trace dataset detected by the seismic detector geophones during the seismic survey. The data processing system includes a processor which assembles in the computer a seismic trace dataset detected by the array of detector geophones during the survey, and selects in the computer from the seismic trace dataset a first break dataset of initial estimates of the refracted energy arrival times at the detector geophones of the array. The processor then sorts the selected initial estimates of arrival times of the first break dataset into offset bins of a travel time attribute cube according to common midpoints for refracted seismic wave travel between the seismic source and individual ones of the detector geophones of the array, the common midpoints being organized into dimensional offsets of the detector geophones of the array. The processor next forms measures of the time distribution of the selected initial estimates of arrival times in individual ones of the offset bins of the travel time attribute cube, and removes from the first break dataset arrival times which differ from the measures of the time distribution by more than a specified time interval. The processor then forms an adjusted arrival trace dataset of the arrival times remaining after anomalous arrival times are removed. The processor next compares the arrival times of the adjusted arrival trace dataset with a specified measure of accuracy. If the compared arrival times of the adjusted arrival trace dataset are within the specified measure of accuracy, the processor stores compared arrival times of the adjusted arrival trace dataset as the corrected measure of the arrival times. If not, the processor performs for the adjusted arrival trace dataset the steps of removing arrival times which differ from the measures of the time distribution by more than a specified time interval, and comparing the arrival times of the adjusted arrival trace dataset with a specified measure of accuracy. The data processing system also includes a memory receiving for storage the compared arrival times of the adjusted arrival trace dataset as the corrected measure of the arrival times.

The present invention also provides a new and improved data storage device having stored in a non-transitory computer readable medium computer operable instructions for causing a data processing system to form corrected measures of refracted seismic energy arrival times during travel from a seismic source to an array of seismic detector geophones during a seismic survey by removing anomalous arrival times from a seismic trace dataset detected by the seismic detector geophones during the seismic survey, the instructions stored in the data storage device causing the data processing system to assemble in the computer a seismic trace dataset detected by the array of detector geophones during the survey, and select in the computer from the seismic trace dataset a first break dataset of initial estimates of the refracted energy arrival times at the detector geophones of the array. The stored instructions then cause the data processing system to sort the selected initial estimates of arrival times of the first break dataset into offset bins of a travel time attribute cube according to common midpoints for refracted seismic wave travel between the seismic source and individual ones of the detector geophones of the array, the common midpoints being organized into dimensional offsets of the detector geophones of the array. The stored instructions next cause the data processing system to form measures of the time distribution of the selected initial estimates of arrival times in individual ones of the offset bins of the travel time attribute cube, and remove from the first break dataset arrival times which differ from the measures of the time distribution by more than a specified time interval. The stored instructions then cause the data processing system to form an adjusted arrival trace dataset of the arrival times remaining after the step of removing, and compare the arrival times of the adjusted arrival trace dataset with a specified measure of accuracy. If the compared arrival times of the adjusted arrival trace dataset are within the specified measure of accuracy, the stored instructions next cause the data processing system to store the compared arrival times of the adjusted arrival trace dataset as the corrected measure of the arrival times. If not, the stored instructions next cause the data processing system to performing for the adjusted arrival trace dataset the steps of removing arrival times which differ from the measures of the time distribution by more than a specified time interval, removing arrival times from which differ from the measures of the time distribution by more than a specified time interval, and comparing the arrival times of the adjusted arrival trace dataset with a specified measure of accuracy

BRIEF DESCRIPTION OF THE DRAWINGS

FIG. 6 is a plot of first break picks from a portion of a three dimensional data set.

DETAILED DESCRIPTION OF THE PREFERRED EMBODIMENTS

Figure 1:
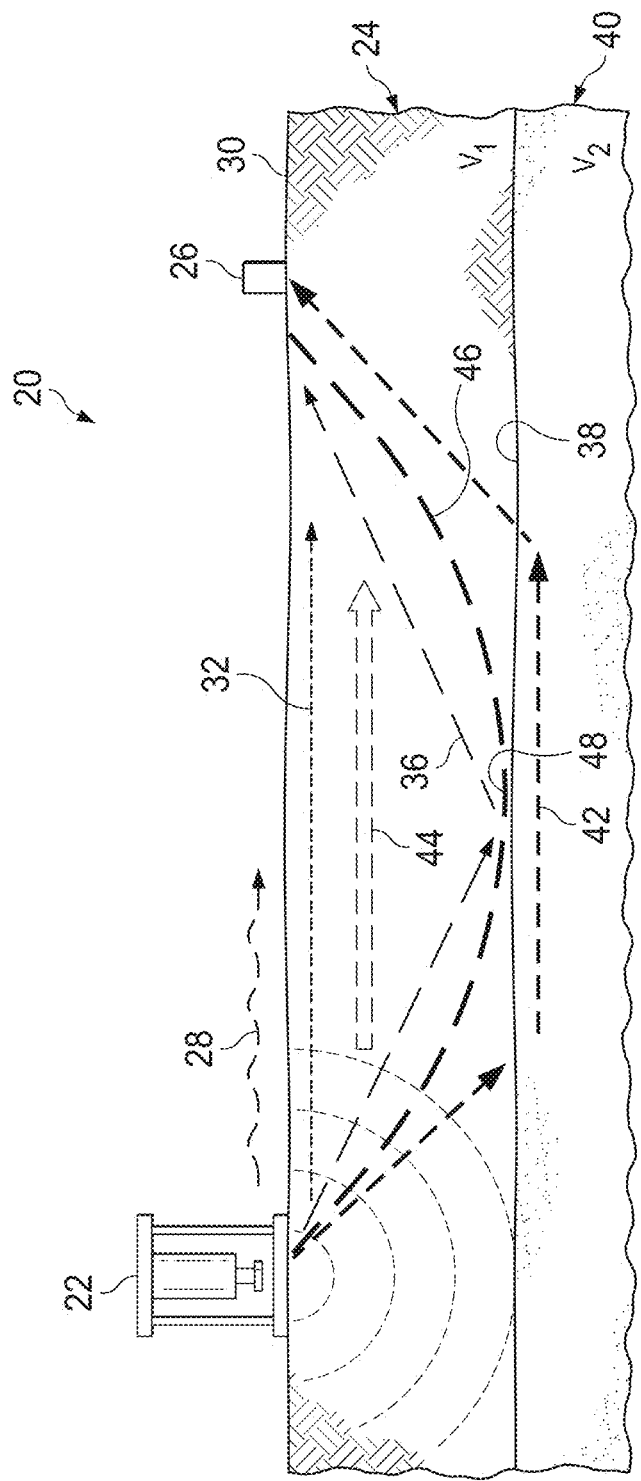
FIG. 1 is a schematic diagram illustrating travel of seismic energy through a near surface region of the earth during a seismic survey.

In the drawings, FIG. 1 illustrates schematically the performance of a seismic survey and the resultant travel paths of what are known as rays indicating the travel paths of seismic energy waves through the earth. The seismic survey shown in FIG. 1 is a two-dimensional survey along a seismic line of profile along a longitudinal direction in a near surface region 20 of the earth. The present invention is equally applicable to three-dimensional surveys or to two intersecting rectangular lines of profile, as well.

As indicated schematically at 22, a seismic source imparts seismic energy which travels along several travel paths through a surface layer 24 at an acoustic velocity $V_1$ for receipt at a number of detector geophones along the line of profile, one of which is shown at 26. The detector geophones serve as sensors or receivers of the seismic energy imparted by the source 22. As shown at 28, what is known as an air wave formed by a portion of the seismic energy travels above the earth's surface 30 from the source 22 to the detector geophones. Portions of the seismic energy from the source 22 also travel along the earth's surface 30 as what are known as surface waves indicated at 32.

A portion of the seismic energy form the source 22 also travels as a reflected wave indicated at 36 downwardly from the source 22 through the near surface region 24 to an interface 38 formed between the near surface 24 and a lower formation geologic layer indicated at 40. In the near surface layer 24, the seismic energy travels at the acoustic velocity $V_1$ while the layer 40 exhibits a different acoustic velocity $V_2$. Because of the differing velocity (i.e. seismic impedance) a portion of the seismic energy is reflected at the interface 38 as the reflected wave 36.

Another portion of the seismic energy form the source 22 is refracted at the interface 38 and travels along the interface 38 as a refracted wave indicated at 42 for some distance as shown in FIG. 1 until the refracted wave energy travels upwardly to the detector geophones. A direct wave shown at 44 indicates the travel of a portion of the imparted seismic energy from the source 22 at the acoustic velocity $V_1$ in the near surface 24 to the detector geophones.

Thus, when the earth is excited with energy from the elastic wave source 22, the wave propagation can be approximated and described by rays. Reflected waves such as at 36 and refracted waves such as at 42 are scattered at velocity interfaces such as 38. At certain spacings of the source 22 and the detector geophones, the ray paths of wide angle (i.e. post critical) reflected waves 36 are close to the ray path 42 of a type of refracted wave called diving wave or continuously refracted wave which would generate if the velocity would be gradually increasing with depth with a gradient. The present invention utilizes this physical manifestation of seismic energy travel indicated schematically at 46 in FIG. 1 for wide angle ray paths to indicate and identify an apex of a refracted simulated curvilinear ray path as shown at 48.

The present invention involves the seismic data processing sequence and is performed to provide an iterative methodology implemented in computers both for refinement of first break picks and for quality control of the acoustic velocity data which results. The present invention is to a great extent automated and is based on robust statistics.

Figure 7:
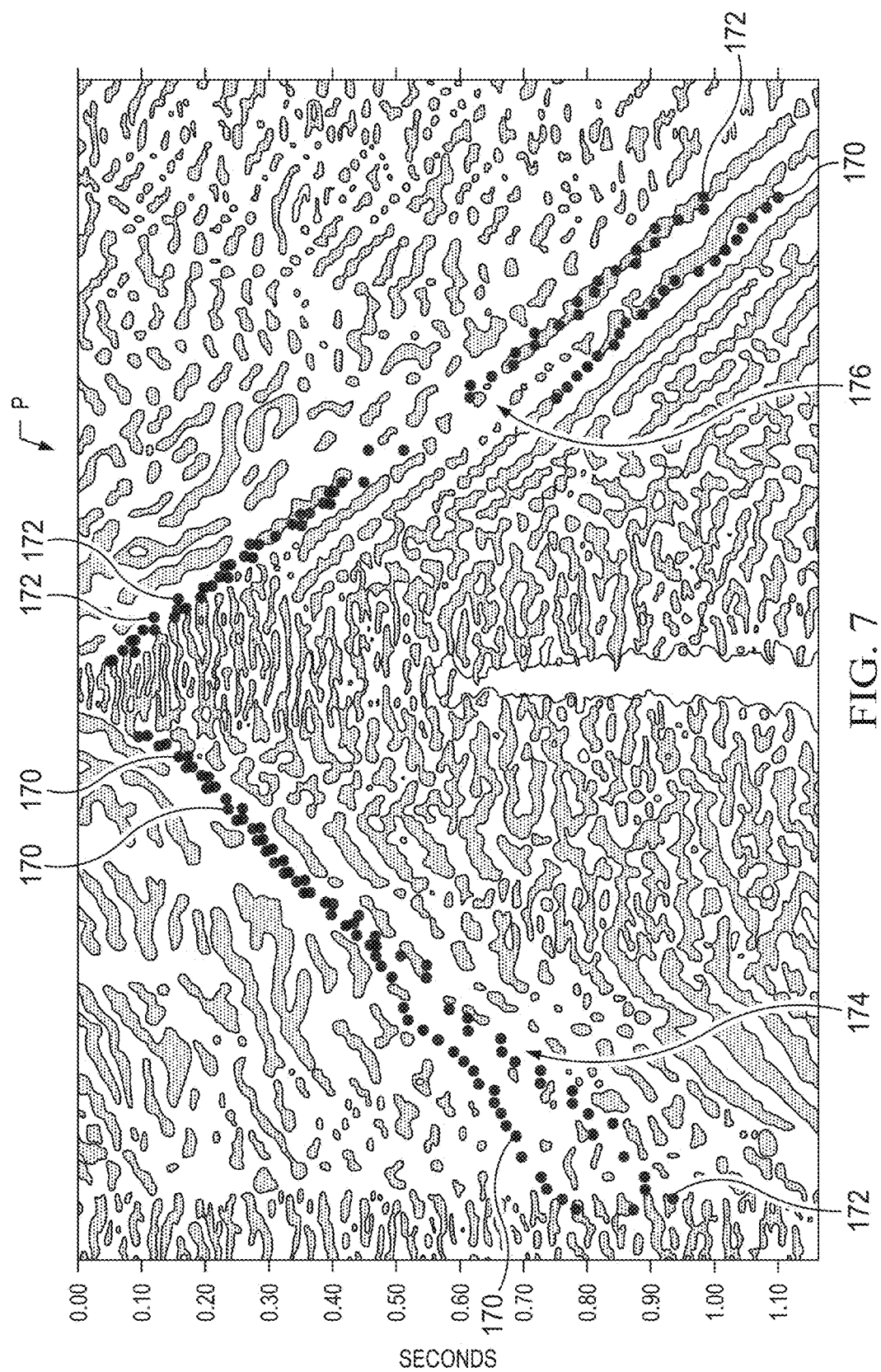
FIG. 7 is a plot of a seismic data gather for a three dimensional land data set indicating comparative results of prior art manual quality control or QC first break picking and estimation of mean first break values in the common midpoint offset domain according to the present invention.

FIG. 7 contains a plot for display of seismic traces known as a seismic data gather for a three dimensional land data set from a seismic survey. The display contains a number of seismic traces, one for each spaced detector geophone in the survey and each of which indicate the responses sensed by detector geophones to the travel of seismic waves of the form shown in FIG. 1. During a seismic survey, a number of such responses like those shown plotted in FIG. 6 are obtained for processing. Over periods of time, the surveys can be repeated to obtain seismic data for what are known as four dimensional data. Seismic data from such surveys are then processed to obtain images of rock formations and their locations in an area of interest beneath the earth's surface.

For refracted waves, the apex 48 of the curvilinear ray path 46 so formed is defined according to the present invention to be the point where most of the wave refraction occurs, although this is not always what physically occurs during refracted wave travel. The apex 48 according to the present invention is however a measure determinable from refraction wave data and with the present invention defines a point about which the seismic survey data for large seismic surveys exhibiting the same phenomenon are gathered for further analysis and processing. This characterization and identification is applicable for most low-relief layer-based geology of near surface regions and characterizes the vast majority of sedimentary basins worldwide.

The present invention determines the physical location in the earth of an apex or common mid-point for refracted wave travel such as shown at 48 in FIG. 1 of a refracted simulated curvilinear ray path based on the survey data for each source-receiver point of the survey. The apex as determined serves as a data gather point to sort first break picks for seismic data records or traces into offset bins or voxels based on the survey dimensional data. The bins may contain different numbers of traces, and of different co-ordinate dimensions.

The refracted energy is actually physically traveling along the interface 38 at the location of apex 48 and thus, does not travel along the curvilinear ray path 46 except for cases where the velocity gradient is constant or in other words where the velocity is gradually increasing with depth rather than across sharp discontinuities. The apex 48 in most of the cases is thus not physically a common midpoint or CMP as it would be for reflected energy since refracted energy is involved. However, according to the present invention, the apex 48 is regarded as a common midpoint for the refracted energy. The apex 48 serves as the basis for organizing and sorting the seismic survey dataset according to the present invention.

Figure 2:
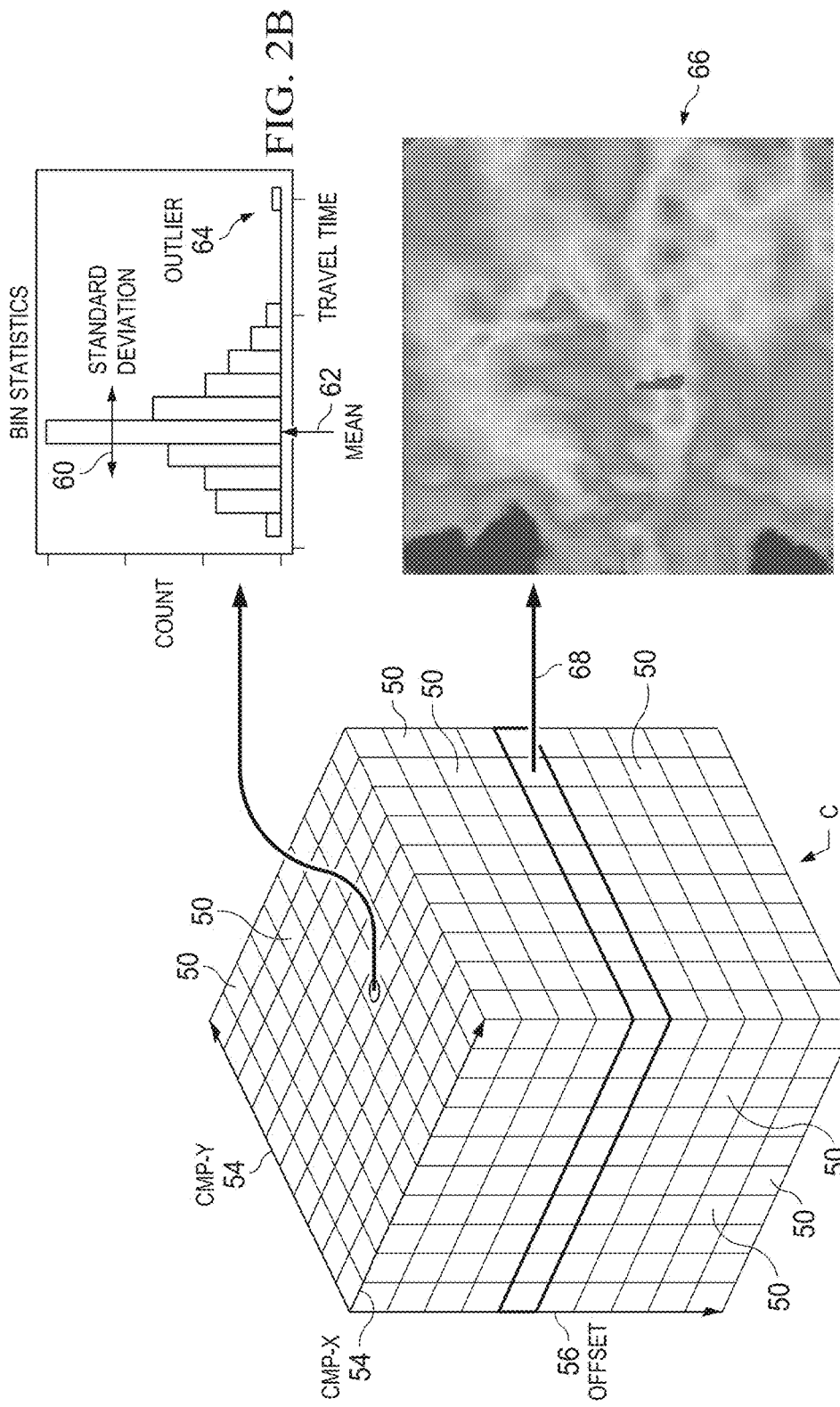
FIG. 2A is a schematic diagram of a hypercube of a seismic travel time attribute according to the present invention.
FIG. 2B is a schematic diagram of statistics obtained for the seismic travel time attribute for a data bin of the hypercube of FIG. 2A.
FIG. 2C is an example plot of a travel time common offset map and attendant color key formed according to the present invention.

With the present invention, a large three dimensional first break dataset is organized in a single cubic volume C (FIG. 2A) composed of a number of voxels or bins of 50, where each voxel 50 stores a collection of first break picks occurring in a three dimensional space. In the embodiment of FIG. 2A, the cubic volume C is composed along intersection axes of offset spacing times based on a Delta-X spacing as indicated at 52, a Delta-Y offset spacing as indicated at 54, and a Delta-Offset offset spacing as indicated at 56. Within each voxel 50 statistics are calculated on the first break data assigned to that voxel to determine multimodal distributions of travel times and derive robust travel time estimates (according to mean, median, mode, standard deviation, kurtosis, and other suitable statistical accuracy analytical measures) related to azimuthal sectors allocated to the bin or voxel 50.

This methodology allows statistical representation in a single volume of a large three dimensional first break pick dataset into a single organizational module for processing and analysis. The present invention assembles data representing common physical features into a group for statistical analysis, rejection of anomalous or aberrant first break picks, which are known as outliers, and verification of the consistency of the results relative to the underlying geology. A visual inspection of the first break pick dataset is made possible by dissecting the obtained volume with various planes and, as an additional step, analytical functions can be derived to describe the distribution of the property in the volume and to possibly predict data where gaps are present.

FIG. 2B illustrates schematically an example statistical representation of the distribution for a single voxel 50 of the cube C of FIG. 2A. This is performed by sorting the three dimensional first break pick dataset of the cube C into individual binned travel time attribute cubes represented by the individual voxels 50.

The standard deviation (σ) of the first break pick values for an example such voxel is indicated schematically in FIG. 2B at 60, while a mean value of first break picks is indicated schematically at 62. An anomalous or aberrant first break pick value or outlier is indicated schematically at 64 in FIG. 2B. Based on the other first break pick values of the voxel 50 in FIG. 2B, the outlier first break pick 64 is one not satisfying the statistical filtering, and thus statistically unreliable. If included in first break auto picking, an outlier value such as that at 64 is likely if included to distort the accuracy of further processing of the survey data. FIG. 2C is an example plot 66 of a mean travel time common offset map formed according to the present invention for a certain offset as indicated by an arrow 68 referencing the location of that offset in the data matrix of the cube C. The travel times mapped in FIG. 2C are statistically processed values, after removal of outliers, with a color key 70 indicating the variations of the first break parameter values in milliseconds (msec or ms).

Figure 3:
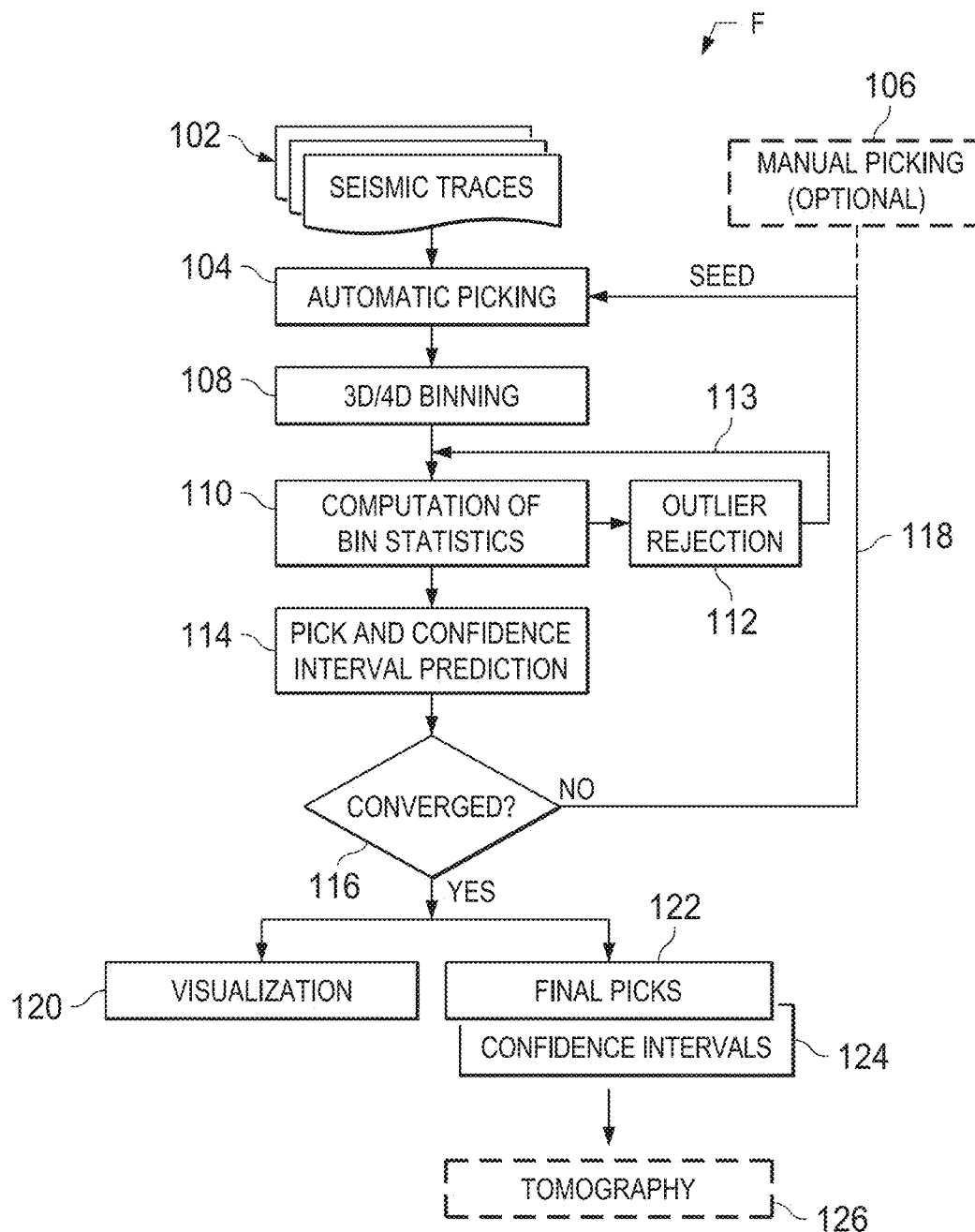
FIG. 3 is a functional block diagram of a flow chart of data processing steps for iterative automatic first break picking in a common midpoint offset domain according to the present invention.
Figure 10:
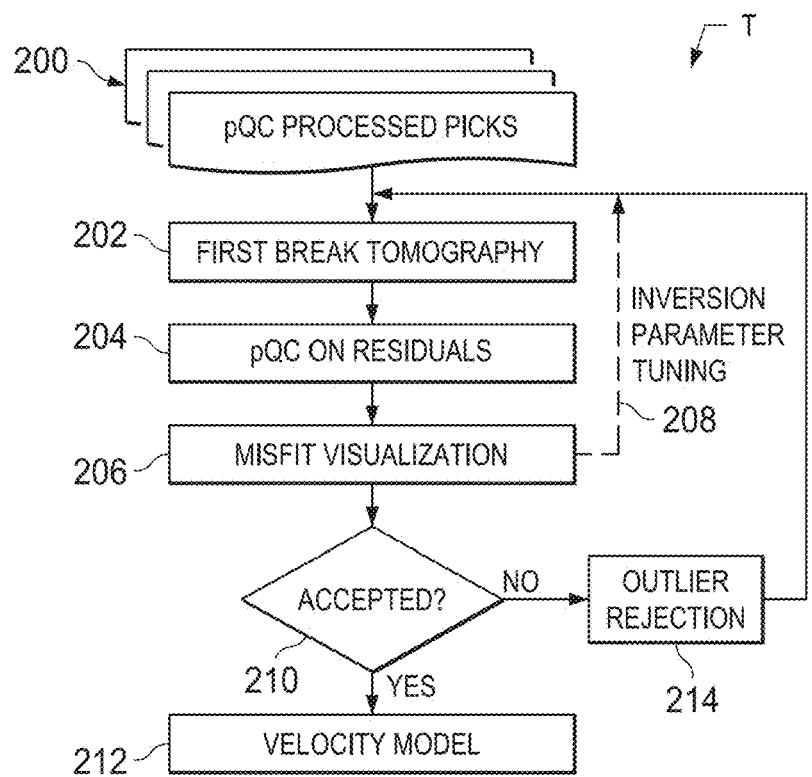
FIG. 10 is a functional block diagram of a flow chart of data processing steps further processing according to the present invention based on the results of the processing according to FIG. 3.

A comprehensive computer implemented methodology of modeling to improve the selection of accurate and reliable first break picks for seismic survey data according to the present invention is illustrated schematically in FIGS. 3 and 10. FIG. 3 illustrates a flow chart F setting forth the methodology of the present invention for selection of first break picks for seismic survey data. FIG. 10 illustrates a flow chart T setting forth the methodology of the present invention for modeling to automatic quality control of the time picks for the survey data.

The flow chart F and the flow chart T illustrate the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of data transformation or processing steps corresponding to those shown.

The flow chart F of FIG. 3 illustrates schematically a preferred sequence of steps of a computer implemented process for determining by iterative first break picking for seismic survey data after removal of anomalous first break picks of the data organized into offset bins according to the present invention.

As can be seen from the flow chart F, processing according to the present invention begins at step 102 with a collection of seismic traces, also known as a seismic gather. FIG. 7 is an example plot of such a gather. Next, as indicated at step 104, first break pick values such as those shown in FIG. 7 and determined by an automatic picking process according to a suitable conventional autopicker technique is performed. Examples of such an autopicker are the collection of methods according to Sabbione, J. I., & Velis, D. (2010), Automatic first-breaks picking: New strategies and algorithms, Geophysics, 75(4), 67-76; and the reference waveform method according to U.S. Pat. No. 7,675,813, Valero, et al (2010).

It should be understood that other autopickers are contemplated and may be used. Also, as indicated at step 106, an analyst or engineer if desired may, by what is known as manual picking, provide as input starting points for autopicking selected first break picks or in effect seed values or seeds for the autopicking during step 104.

During step 108, a database of first break picks determined during step 104 is assembled by a sort according to three dimensional or four dimensional binning illustrated schematically in FIG. 2A. The binning is performed by sorting the survey data into a cubic volume C in CMP-X and CMP-Y positions which correspond to the apex 48 of the curvilinear ray path 46. The vertical dimension of the cube C is offset, the source-receive distance, such as the horizontal distance from source 22 to receiver 26. The voxels 50 of the cube C are filled in with travel times (or first break picks) corresponding to the rays having the specified geometric characteristics (CMP-X, CMP-Y and offset).

The binning results are thus indicative of the location of the apex 48 for each source-geophone pair in the survey. An example of the results of step 108 is that described in the Delta-X, Delta-Y, Delta-Offset, Delta-Azimuth domain and shown in FIG. 2A. The result of step 108 is a collection of each of the three dimensional first break pick dataset in a travel times attribute cube for first break pick values resulting from step 104.

During step 110, computation of bin statistics such as, but not limited to, standard deviation, takes place for each bin. The processing during step 110 includes scanning of the data by azimuthal sectors and the identification of multimodal distributions. First break picks not satisfying the statistical criteria are then eliminated from the dataset during step 112. The outlier rejection during step 112 may be repeated if desired as an iterative step as indicated at 113.

After completion of the statistical analysis in step 110 and statistical rejection of outliers in step 112, during step 114 a mean or median value of a first break pick time value for the bin 50 or other statistical function or norm of the first break time is estimated for each bin. The result of step 114 defines a specified time interval during further processing. The determination during step 114 is made adaptively and differs for each bin 50. If desired, the determination, for a bin can be based on the measured dispersion within that bin, multiplied by a user-specified factor.

In addition, a confidence interval or measure of statistical dispersion such as standard deviation $\sigma$ or mean absolute deviation (MAD) of the first break pick for each bin is also determined. Other indicators such as skewness or kurtosis can be determined with the objective to characterize the statistical distribution of the travel times in each bin. In the presence of random noise this distribution is expected to be Gaussian. Deviations from this assumption may indicate the presence of anisotropy or sharp lateral contrasts in the velocity. Hence the higher-order statistics may be used as attributes to map these anomalies automatically.

Step 116 involves computer processing to evaluate the standard deviation (or as described above, another statistical measure of dispersion of the values) is above or a specified threshold. If so, the processing has not converged and the obtained first break pick estimate is used as indicated at 118 to as an input value or "seed" for the successive autopicking iteration of step 104.

Figure 5B:
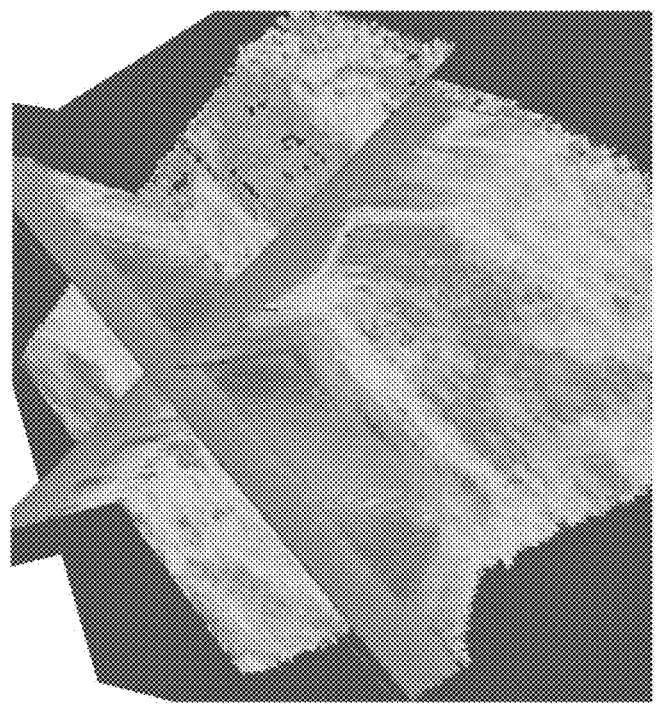
FIG. 5B is an isometric view of a three dimensional plot of travel time standard deviation in the same seismic data set after processing according to the present invention.
Figure 5A:
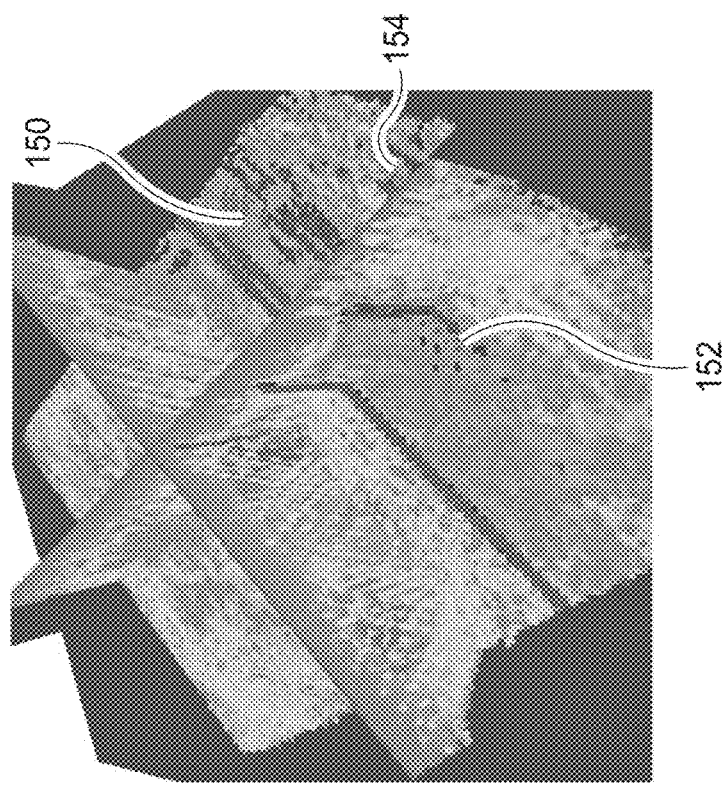
FIG. 5A is an isometric view of a three dimensional plot of travel time standard deviation in a seismic data set before processing according to the present invention.

The standard deviation s (or another statistical measure of dispersion of the types mentioned above for the first break pick values) for each Delta-X, Delta-Y, Delta-Offset, Delta-Azimuth bin 50 should usually decrease at each successive iteration indicating the convergence of the procedure. Due to the central limit theorem, and under the assumption of spatial correlation within a CMP-offset bin, the distribution of picks is expected to approximate a Gaussian distribution. Outliers are identified by discarding estimates whose deviation from the sample mean exceeds the standard deviation (sigma) by more than a specified factor (K). As described below, the images I-1 and I-2 in FIGS. 5A and 5B show the standard deviation of first break picks calculated for each bin before and after the rejection (i.e. cleaning) procedure, respectively.

Figure 11:
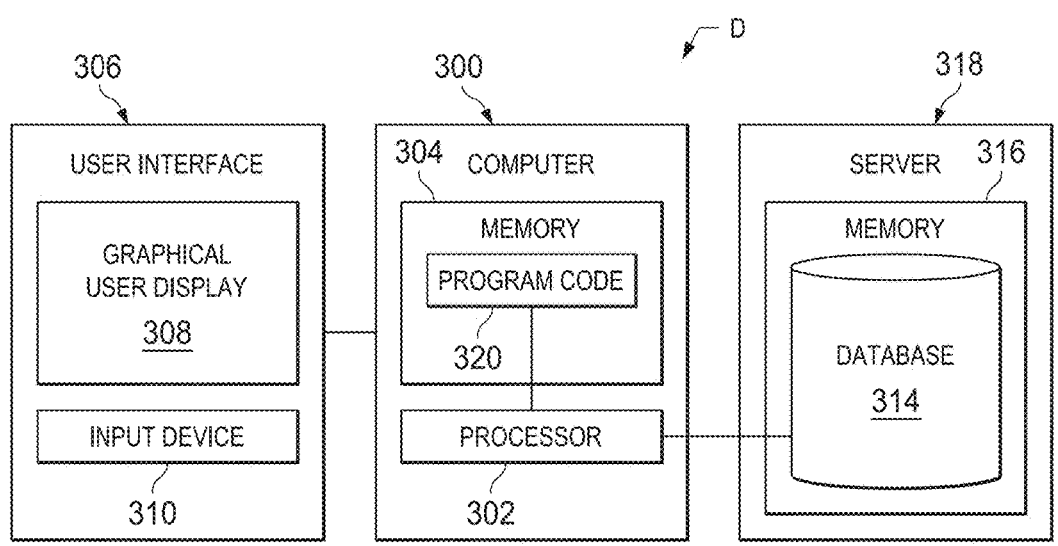
FIG. 11 is a schematic diagram of a data processing system according to the present invention for processing seismic data according to the processes of FIGS. 3 and 10.

If the computed standard deviation (or other statistical measure of dispersion of the values) for each bin 50 is determined to be below the provided threshold, threshold convergence has occurred and processing continues to step 120, with visualization of the results by a display of the processing results from the data processing system D (FIG. 11). The improved first break-pick for the bins 50 of the cube C are stored as indicated at step 122 and represent a first break pick dataset bounded by the confidence intervals as indicated at step 124 from the statistical analysis performed during step 114 which are then used as input first break values to perform tomographic inversion indicated at step 126.

Figure 4B:
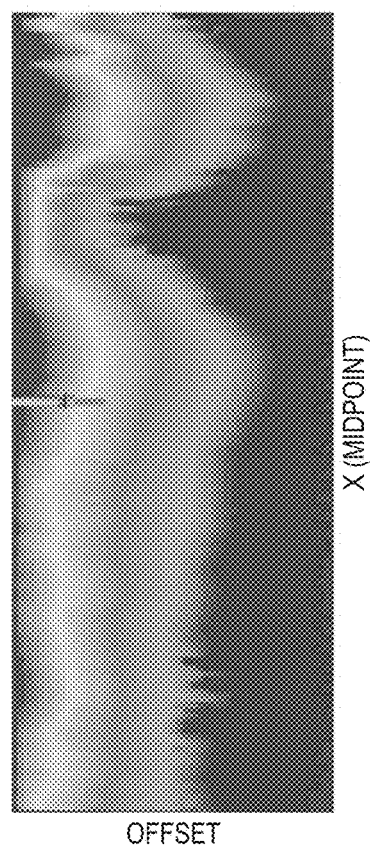
FIG. 4B is an example plot of a cross-section through a travel time volume of interest with offset as the vertical axis.
Figure 4C:
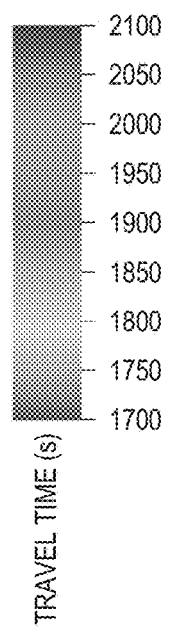
FIG. 4C is a key indicating the numerical values of the travel times shown in the data of the example plots of FIGS. 4A and 4B.
Figure 4A:
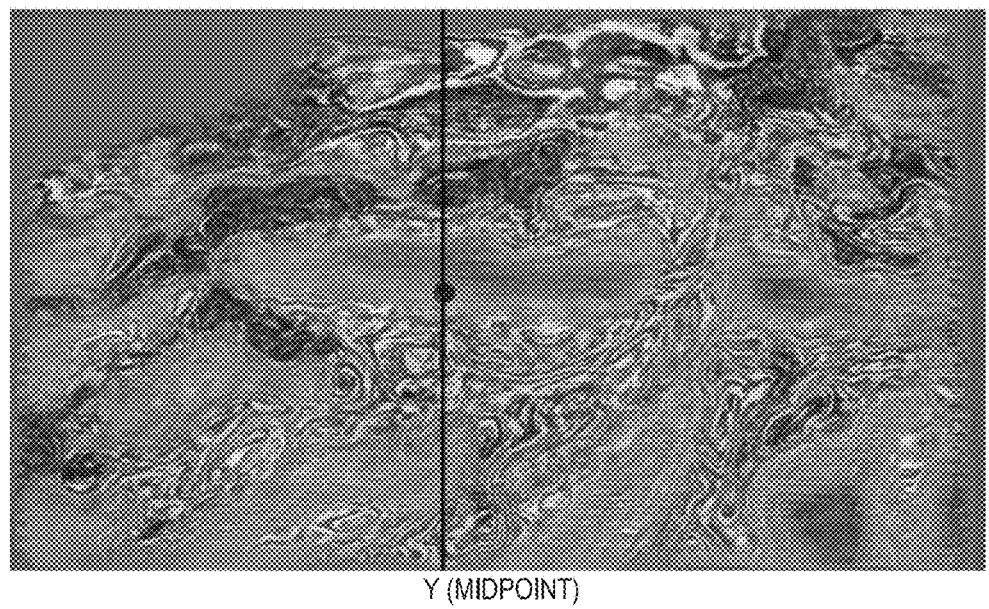
FIG. 4A is an example plot of a travel time map formed according to the present invention superimposed to a depth slice of a seismic volume of interest.

FIGS. 4A, 4B and 4C show the results of application of the methodology of iterative first break picking according to FIG. 3 to actual seismic survey data to investigate the statistical accuracy of the original data and to remove outliers according to the present invention. The survey data contained more than 2 billion first break picks obtained from conventional prior autopicker techniques from a marine seismic survey in a salt tectonic area. The distribution of travel times, after application of statistics to remove the outliers, can be seen to be consistent with the underlying geology as shown by the seismic depth slice (pre-stack depth migration).

FIG. 4A is a plot of a mean travel time common offset map for the actual data for one value of offset. FIG. 4B is a plot of a travel time map along a seismic line of profile in the survey, again as a function of offset. FIG. 4B is thus a cross-section through the travel time volume where, as indicated, the vertical axis is offset, instead of depth. FIG. 4C is a color key indicating variations in milliseconds of the travel times plotted in FIGS. 4A and 4B. The consistency of travel times with the underlying geology is evident. Areas where there are salt bodies can be identified due to the attendant shorter travel times. Similarly, areas where there is what is known as mini-basins with attendant larger travel times are also evident.

Figure 5C:
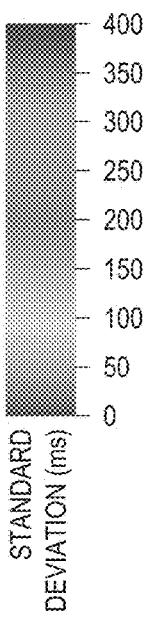
FIG. 5C is a key indicating the numerical values of the travel time standard deviation shown in the data of the example plots of FIGS. 5A and 5B.

The determination of robust statistics and travel times according to the present invention for each of the Delta-X, Delta-Y, Delta-Offset, Delta-Azimuth bins of dataset cube C with the present invention also allows identification and rejection of outliers so that billions of first break picks can be automatically quality controlled. FIG. 5A is a three dimensional plot of standard deviation data from an area of the same survey as that of FIGS. 4A, 4B and 4C but without outlier removal according to step 112 of FIG. 3. FIG. 5B is a three dimensional plot of standard deviation data from the same survey area as FIG. 5A, but after rejection of first break pick outliers being outside a confidence level K of twice the determined standard deviation or 2$\sigma$. FIG. 5C is a color key of standard deviation $\sigma$ in milliseconds or ms. The absence is notable in FIG. 5B in those areas of FIG. 5A such as 150, 152, and 154, for example, where large values of standard deviation are indicated according to the key of FIG. 5C.

A visual control of the cleaning procedure is provided for a three dimensional land dataset by FIG. 6. FIG. 6 is a plot of a number of first break picks for the same survey as that of FIG. 2C. First break picks indicated at 160 and 162 are those that were eliminated by the application of the statistical analysis according to the methodology of the present invention. These first break picks exhibit an out-of-trend distribution from the remaining picks of the data displayed.

FIG. 7 is a plot of an example seismic gather from a three dimensional land data set. In FIG. 7, the red dots 170 indicate conventional original (manually quality controlled) first break picks, while the blue dots 172 show the result of the robust picks estimated by the application of processing according to the present invention statistics on the Delta-X, Delta-Y, Delta-Offset, Delta-Azimuth bins of the data cube C. The left side of the seismic gathers in FIG. 7 shows at 174 how the original picks (red) are following an unrealistic trend (noise) anticipating the correct phase of the refracted wave. In contrast, first break picks 172 obtained after the application of the statistical procedure of the present invention identify a correct seismic phase at increasing offsets.

The right side of the gather of FIG. 7 shows at 176 an opposite behavior with the original picks (red) at 170 identifying a later arrival (cycle skip) and the picks at 172 after statistical analysis (blue) identifying the correct seismic phase. The example of FIG. 7 shows that not only can the present invention dramatically shorten the cycle time of first break picking, but the present invention also allows analysts to derive better first break-pick estimates than could be obtained by manual picking and manual quality control.

Figure 8:
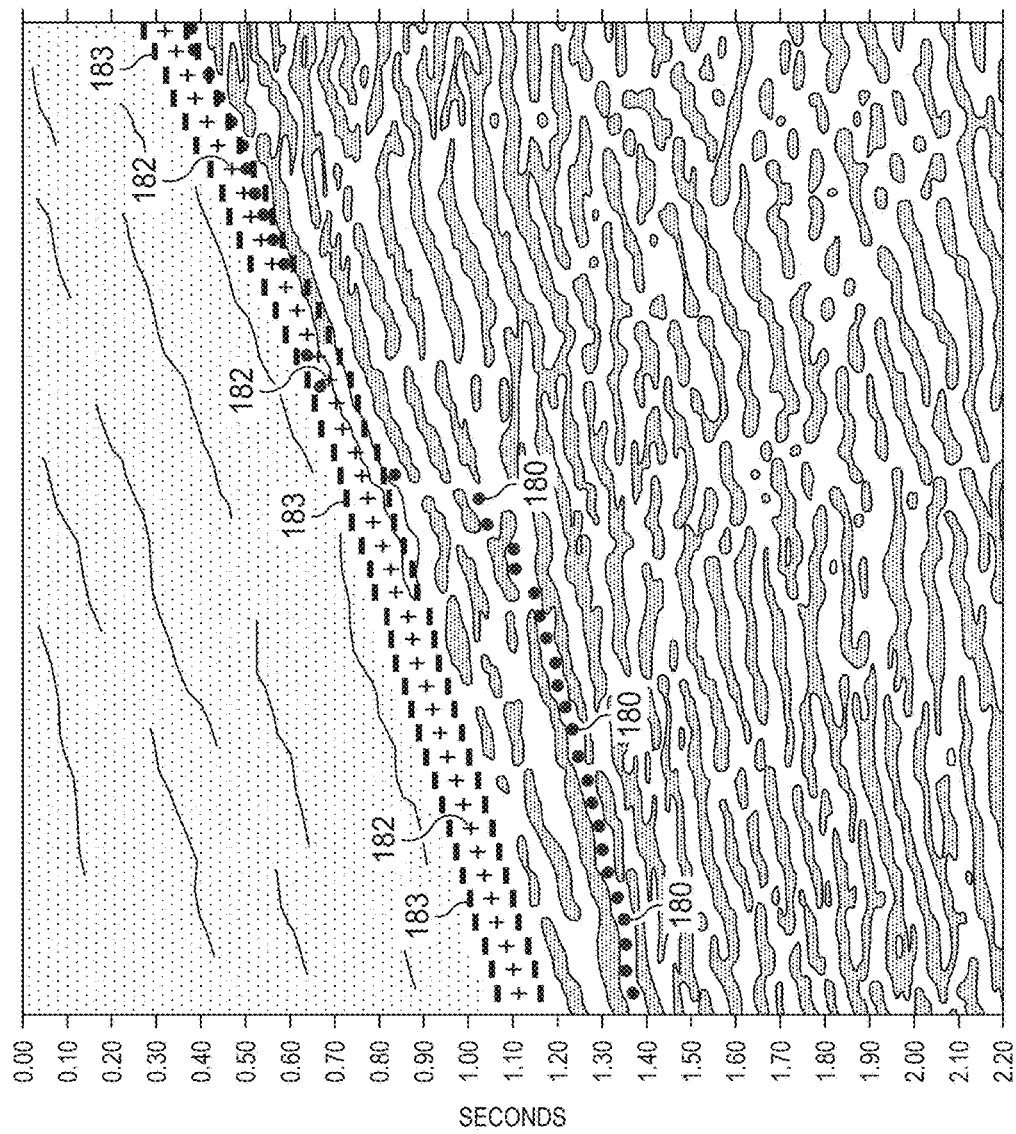
FIG. 8 is a plot of seismic data gather after iterations of automatic first break picking in the common midpoint offset domain according to the present invention.

FIG. 8 is a plot of seismic data over three successive processing iterations based on first break picks obtained with conventional autopicking in contrast with first break picking according to the present invention. As shown at 180, picks (dots) indicate the original autopicker results for a large three dimensional land seismic dataset where several cycle skips occur especially at longer offset. The comparative plots also show first break picks obtained over three successive iterations based on processing according to the present invention without any human intervention applied to the same seismic dataset. As shown at 182, the first break picks (crosses) represent the results of a processing according to FIG. 3 with successive new first break picking processing of step 114. Also shown at 183, are the confidence levels resulting from the statistical analysis performed in step 114 to determine the confidence levels for the repicking operation.

The obtained first break pick distribution 182 in FIG. 8 can be used directly for deriving a robust velocity model through a tomographic procedure.

For large surveys such as those involved in the processing of FIG. 8 manual intervention would have required months of analyst time and effort for the survey dataset.

It can thus be seen that the present invention is applicable and useful for survey data in two dimensional, three dimensional or four dimensional space: X, Y, Offset, and Azimuth. Functions such as cubic b-splines or other polynomial functions fitting the data can be defined and used to impose smoothness among the domains (X, Y, Offset, and Azimuth). This allows a robust multi-dimensional analytical prediction of the first break picks to be used as seed for the autopicking iterative process.

Additional developments of the methodology according to the present invention include azimuthal analysis of first break picks in the Delta-X, Delta-Y, Delta-Offset, Delta-Azimuth bin. In this way, multimodal statistics can be used to optimizing the statistical filtering to remove anomalous or aberrant data, such as rejection of first break pick outliers, and obtain robust pick estimates by azimuthal sectors. In addition to a more focused statistics in the azimuthal domain, the present invention provides the ability to identify effects related to anisotropy. By scanning azimuthal sectors and by applying the techniques of the present invention, analysts can readily identify directions of faster and slower wave propagation that could relate to anisotropic effects, such as those produced by fractures. Anisotropy information directly so derived from the data analysis is important for advanced seismic processing and velocity analysis in addition to providing information to interpreters and reservoir engineers.

Figure 9A:
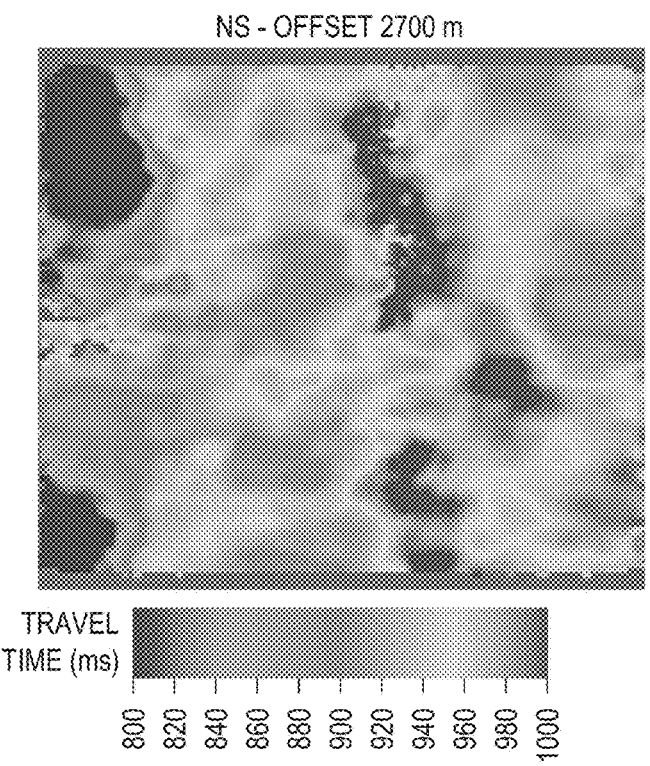
FIG. 9A is a data plot of mean travel time map formed for north-south (N-S) quadrants at a common offset for a three dimensional land data set according to the present invention with a key indicating the numerical values of the travel time.
Figure 9B:
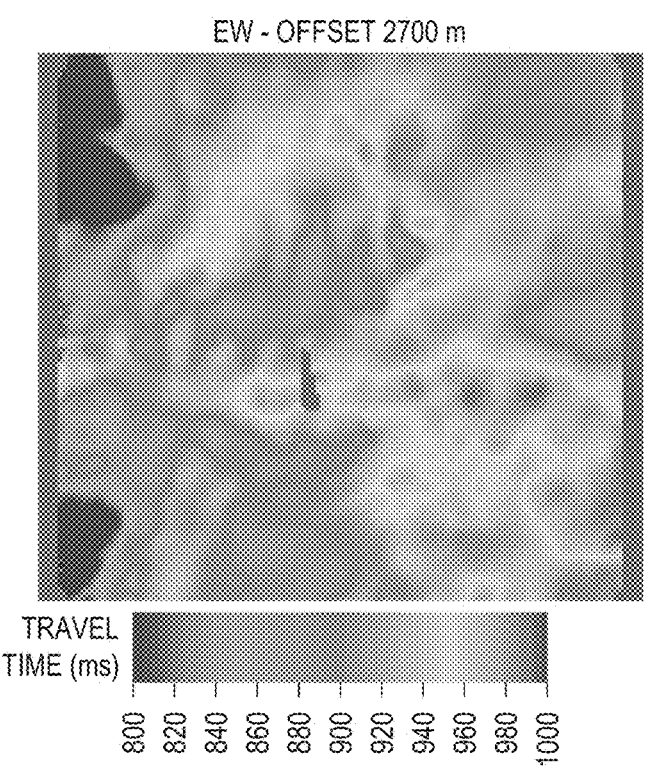
FIG. 9B is a data plot of mean travel time map formed for east-west (E-W) quadrants at the common offset of FIG. 9A for the three dimensional land data set according to the present invention with a key indicating the numerical values of the travel time.
Figure 9C:
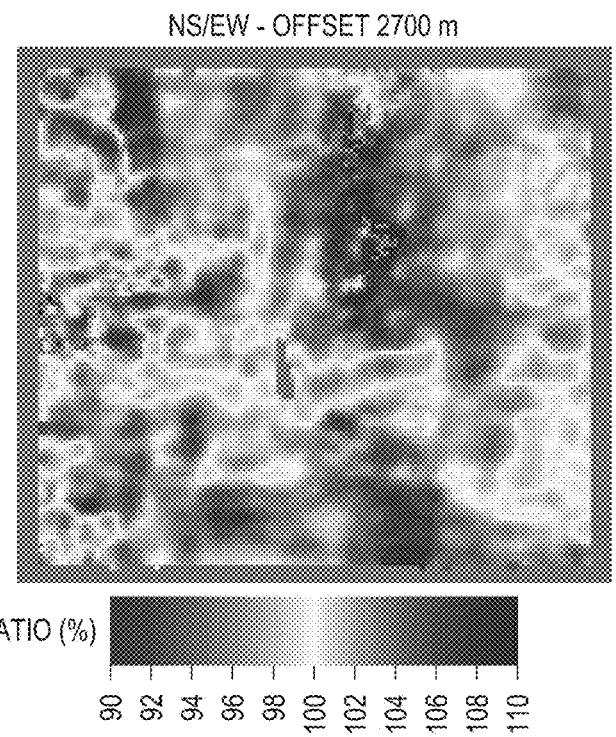
FIG. 9C is a data plot of the percentage ratio of mean travel times of the data of FIGS. 9A and 9B with a key indicating the numerical values of the ratios shown.

FIGS. 9A, 9B and 9C illustrate application of scanning azimuthal sectors and by applying the techniques of the present invention to a three dimensional land dataset. The mean estimated travel times shown in FIG. 9A from first break picks for an offset of 2700 m in a survey in the north-south N-S quadrants (from −45° W to 45° E) are noticeably different from the first break picks shown in FIG. 9B for east-west E-W quadrants (45° E to 135° E) and their ratio indicates the presence of significant azimuthal variations. Attendant color keys in FIGS. 9A and 9B indicate the values in ins of travel time plotted. FIG. 9C is a plot of the ratio of the estimated travel times of FIGS. 9A and 9B with an attendant color key to indicate values represented. The ratio differences between the estimated first travel time values of FIGS. 9A and 9B and the plot of FIG. 9C of their ratio indicate the presence of significant azimuthal variations in the subsurface structure.

The present invention can also be applied to residual travel times from a tomographic inversion procedure as a further additional application. Traditionally, a single number or value (RMS) has been used to determine how well the inversion procedure reproduced the observations. This number is computed as the square root of the weighted mean of the squared deviations between the measured and the predicted values, where the weights are estimates of the statistical accuracy of the measurements. However, this has been found not provide a useful diagnostic to improve the data editing.

With the present invention, a three dimensional residual attribute cube is provided to allow an analyst or geophysicist to assess the data fit in a spatial sense. This greatly improves the understanding of the dataset and facilitates the tuning of subsequent modeling. Furthermore, the binned statistics can be used as a reasonable estimate of data covariance, whose determination is very important for linearized inversion processing methods of the type commonly used in the industry.

The present invention also provides an assessment of the data fit after a travel time tomography is performed. The residual statistics from first break picking according to FIG. 3 can be used to determine areas or offset ranges where the inversion is unable to satisfactorily represent the data.

FIG. 10 illustrates in flow chart T the application of the present invention to residual times from tomographic inversion. During step 200, the processed and optimized first break picks, such as those resulting from processing at step 122 in FIG. 3, are used to perform an inversion or tomography process at step 202. The residual travel times obtained for each source-receiver pair of the survey dataset is binned during step 204 in the Delta-X, Delta-Y, Delta-Offset domains in a manner like that of step 108 of FIG. 3. Additional binning in step 204 may also include binning in the Delta-Azimuth domain.

The binned travel time residual attribute cube is also computed during step 204 and the misfit values are visualized in step 206 by computer display in any lineal, two dimensional or three dimensional visualization. This permits the analyst to assess the data fits. The analysis performed can be used as indicated schematically at step 208 to fine tune the parameters of the inversion and loop back or iterate to the tomographic step 202 as indicated. The results of the residual travel time misfit value analysis of step 204 are compared against an accepted determined threshold during step 210. If the results are smaller than the determined threshold, the results are stored in memory of the data processing system D. Then during step 212 a final velocity model may be obtained. If the results are indicated in step 210 to be larger than the threshold, an outlier rejection procedure step 214 is performed on the binned travel time residual attribute curve like that described above for step 112 of FIG. 3, before processing loops back to tomography step 202, and repeating the shape as indicated in FIG. 10.

As illustrated in FIG. 11, the data processing system D includes a computer 300 having a processor 302 and memory 304 coupled to the processor 302 to store operating instructions, control information and database records therein. The data processing system D may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y., or other source. The data processing system D may also be a computer of any conventional type of suitable processing capacity, such as a personal computer, laptop computer, or any other suitable processing apparatus. It should thus be understood that a number of commercially available data processing systems and types of computers may be used for this purpose.

The processor 302 is, however, typically in the form of a personal computer having a user interface 306 and an output display 308 for displaying output data or records of processing of seismic survey data according to the present invention. The output display 308 includes components such as a printer and an output display screen capable of providing printed output information or visible displays in the form of graphs, data sheets, graphical images, data plots and the like as output records or images.

The user interface 306 of computer 300 also includes a suitable user input device or input/output control unit 310 to provide a user access to control or access information and database records and operate the computer 300.

Data processing system D further includes a database 314 stored in memory, which may be internal memory 304, or an external, networked, or non-networked memory as indicated at 316 in an associated database server 318. The database 314 also contains various seismic data including the in the form of seismic traces, source and geophone position coordinates, survey times and parameters and other data.

The data processing system D includes program code 320 stored in a data storage device, such as memory 304 of the computer 300. The program code 320, according to the present invention is in the form of computer operable instructions causing the data processor 302 to perform the methodology of improving the selection of first break picks for seismic data in seismic data processing and improving quality control of the first break picks.

It should be noted that program code 320 may be in the form of microcode, programs, routines, or symbolic computer operable languages that provide a specific set of ordered operations that control the functioning of the data processing system D and direct its operation. The instructions of program code 320 may be stored in non-transitory memory 304 of the computer 300, or on computer diskette, magnetic tape, conventional hard disk drive, electronic read-only memory, optical storage device, or other appropriate data storage device having a computer usable medium stored thereon. Program code 320 may also be contained on a data storage device such as server 308 as a non-transitory computer readable medium, as shown.

The processor 302 of the computer 300 accesses the seismic survey data pressure transient testing data and other input data measurements as described above to perform the logic of the present invention, which may be executed by the processor 302 as a series of computer-executable instructions. The stored computer operable instructions cause the data processor computer 300 to determine first break pick times for the seismic survey data traces in the manner described above and shown in FIGS. 3 and 10. Results of such processing are then available on output display 308.

The present invention can be seen to provide improved first break pick estimates which are then used to provide a seed for further autopicking operations, bounded by the calculated standard deviation in the bin, improving and refining the first break picking process. The iteration of the fully automated procedure of Quality Control (QC) in the CMP-offset domain followed by robust pick estimates and automatic re-picking, with seeding on seismic gathers, tends to converge to a refined pick dataset where noise and cycle skips are progressively removed or corrected. Therefore, not only the production cycle time is reduced by orders of magnitude, but more importantly, improved and more robust estimates of the near surface velocity are obtained.

The present invention can also be seen to provide improved fully-automated approach with significant practical implications for near-surface characterization and for seismic velocity analysis in general. The correct determination of the seismic velocities occurring in the first several hundred meters at the surface of the earth or at the sea bottom in case of complex geology is of fundamental importance for the generation of reliable seismic images of oil bearing structures located at variable depths in the earth.

Selection of first break picks according to the present invention tends to converge to a refined pick dataset, since noise and cycle skips are progressively removed or corrected during iterative analytical cycles to remove outliers. Therefore, not only the production cycle time is reduced by orders of magnitude, but more importantly, robust estimates of the near surface are obtained. The new procedure has been tested on marine and land three dimensional datasets with excellent results.

From the foregoing, it can also be seen that the present invention provides robust velocity models for refined velocity analysis steps (such as fill wave inversion) which are greatly improved by the development of more accurate first break picking. Further, the present invention also provides for quality control of the seismic data velocity models to be performed at the initial stages of seismic data processing.

The present invention is also useful in analysis of different seismic attributes such as azimuthal velocity variations that could be indicative of anisotropy, positioning errors of sources/receivers, geometry errors, three dimensional distribution of inversion residuals, analysis of standard deviation of the travel time data useful for estimating data errors in the inversion covariance matrix.

In addition to post-inversion analysis of statistical residuals from the first break picking, the present invention also provide an estimate of the data standard deviation per offset. Thus, a more reliable estimate of the data covariance in the inversion can be made. The importance of a correct estimate of the data covariance in geophysical inversion has been stressed by many, but its practical determination remains an elusive problem. This procedure offers a meaningful and simple mechanism to derive the required sample statistics of the travel time residuals.

With the present invention, the single organizational module for processing and analysis of first break data which is provided also allows derivation of spline or polynomial functions to describe the distribution of the property in the volume and to possibly predict data where gaps are present The invention has been sufficiently described so that a person with average knowledge in the field of geophysics and seismic exploration methods may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of forming an estimate of the velocity of travel of seismic energy waves in the rock formations of the earth by forming corrected measures of refracted seismic energy travel times during travel from a seismic source to an array of seismic detector geophones during a seismic survey by removing anomalous travel times from a seismic trace gather detected by the seismic detector geophones during the seismic survey, comprising the steps of:

(a) assembling in the computer the seismic trace gather detected by the array of detector geophones during the survey;

(b) selecting in the computer from the assembled seismic trace gather a first break dataset of initial estimates of the refracted energy travel times at the detector geophones during the survey;

(c) assembling the selected initial estimates of the refracted energy travel times of the seismic gather into bins of a travel time attribute cube with an at least three-dimensional binning according to dimensional spacing in a first horizontal x dimension, a second horizontal y dimension, and a source-receiver offset axis dimension of refracted energy common midpoint for refracted seismic wave travel during the survey;

(d) forming measures of the time distribution of the selected initial estimates of refracted energy travel times in individual bins of the travel time attribute cube;

(e) removing seismic traces in the individual bins with refracted energy travel times which differ from the measures of the time distribution by more than a specified time interval; and (f) forming an adjusted travel trace gather of the seismic traces remaining in the individual bins after the step of removing;

(g) comparing the travel times of the adjusted travel trace gather in the individual bins with a specified measure of accuracy; and (h) if the compared travel times of the adjusted travel trace gather are within the specified measure of accuracy, (i) storing compared travel times of the adjusted travel trace as the corrected measure of the travel times; and (j) performing a tomographic inversion of the stored corrected measures of the travel times to form an estimate of the velocity of travel of the seismic energy waves in the rock formations of the earth;

and, if not, (k) performing for the formed adjusted travel trace gather the steps of removing seismic traces in the individual bins with refracted energy travel times which differ from the measures of the time distribution by more than a specified time interval, and comparing the travel times of the adjusted travel trace gather with a specified measure of accuracy.

2. The computer implemented method of claim 1, wherein the step of assembling further includes assembling the selected initial estimates of the refracted energy travel times of the seismic gather into the travel time attribute cube according to an azimuth axis of refracted energy common midpoints for refracted seismic wave travel during the survey.

3. The computer implemented method of claim 1, further including the step of forming a confidence indicator measure of the travel times in the individual bins of the travel time attribute cube.

4. The computer implemented method of claim 3, wherein the step of storing further comprises the step of storing the confidence indicator measure of the travel times of the adjusted travel trace gather.

5. A data processing system forming an estimate of the velocity of travel of seismic energy waves in the rock formations of the earth by forming corrected measures of refracted seismic energy travel times during travel from a seismic source to an array of seismic detector geophones during a seismic survey by removing anomalous travel times from a seismic trace gather detected by the seismic detector geophones during the seismic survey, comprising:

(a) a processor performing the steps of:

(1) assembling in the computer the seismic trace gather detected by the array of detector geophones during the survey;

(2) selecting in the computer from the assembled seismic trace gather a first break dataset of initial estimates of the refracted energy travel times at the detector geophones during the survey;

(3) assembling the selected initial estimates of the refracted energy travel times of the seismic gather into bins of a travel time attribute cube with an at least three-dimensional binning according to dimensional spacing in a first horizontal x dimension, a second horizontal y dimension, and a source-receiver offset axis dimension of refracted energy common midpoints for refracted seismic wave travel during the survey;

(4) forming measures of the time distribution of the selected initial estimates of refracted energy travel times in individual bins of the travel times attribute cube;

(5) removing seismic traces in the individual bins with refracted energy travel times which differ from the measures of the time distribution by more than a specified time interval; and (6) forming an adjusted travel trace gather of the seismic traces remaining after the step of removing;

(7) comparing the travel times of the adjusted travel trace gather with a specified measure of accuracy, (8) if the compared travel times of the adjusted travel trace gather are within the specified measure of accuracy, (9) storing compared travel times of the adjusted travel trace gather as the corrected measure of the travel times;

(10) performing a tomographic inversion of the stored corrected measures of the travel times to form an estimate of the velocity of travel of the seismic energy waves in the rock formations of the earth;

and, if not,

(11) performing for the formed adjusted travel trace gather the steps of removing travel times which differ from the measures of the time distribution by more than a specified time interval, and comparing the travel times of the adjusted arrival trace gather with a specified measure of accuracy; and (b) a memory receiving for storage the compared travel times of the adjusted arrival trace gather as the corrected measure of the travel times.

6. The data processing system of claim 5, wherein the processor in performing the step of assembling further assembles the selected initial estimates of the refracted energy travel times of the seismic gather into the travel time attribute cube according to an azimuth axis of refracted energy common midpoints for refracted seismic wave travel during the survey.

7. The data processing system of claim 5, further including the processor performing the step of forming a confidence indicator measure of the travel times in the individual bins of the travel time attribute cube.

8. The data processing system of claim 7, wherein processor in performing the step of storing further performs the step of storing the confidence indicator measure of the arrival times of the adjusted travel trace gather.

* * * * *